Figure 1:
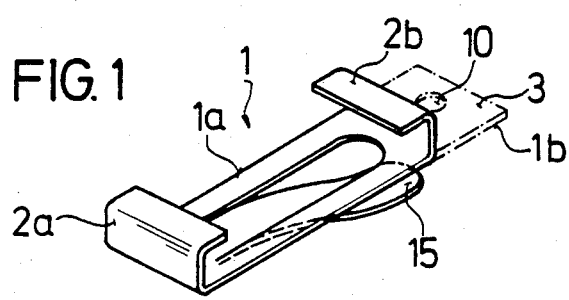

United States Patent [19]

Schoettle

[11] Patent Number: 4,629,144
[45] Date of Patent: Dec. 16, 1986

[54] TAPE CASSETTE HAVING ONE OR MORE PRESSURE SPRINGS, AND A PRESSURE SPRING FOR THIS PURPOSE

[75] Inventor: Klaus Schoettle, Heidelberg, Fed. Rep. of Germany

[73] Assignee: BASF Aktiengesellschaft, Ludwigshafen, Fed. Rep. of Germany

[21] Appl. No.: 744,226

[22] Filed: Jun. 13, 1985

[30] Foreign Application Priority Data

Jun. 15, 1984 [DE] Fed. Rep. of Germany ... 8418178[U]

[51] Int. Cl.⁴ .................. G03B 1/04; G11B 15/32
[52] U.S. Cl. ...................... 242/198; 360/132
[58] Field of Search ........ 242/198, 199, 200; 360/96.1, 96.3, 96.5, 96.6, 132

[56] References Cited

U.S. PATENT DOCUMENTS 3,801,042 4/1974 Dobson ..................... 242/198 X
3,934,839 1/1976 Serizawa ..................... 242/198
4,323,937 4/1982 Santora ..................... 242/198 X
4,368,860 1/1983 Goto ..................... 242/199
4,496,118 1/1985 Oishi et al. ..................... 242/198
4,526,330 7/1985 Shimizu ..................... 242/199
4,546,938 10/1985 Okamura et al. ..................... 242/199 X Primary Examiner—Donald Watkins
Attorney, Agent, or Firm—Keil & Weinkauf

[57] ABSTRACT

A tape cassette (20) has at least one pressure spring (1; 13; 14; 16) for exerting a spring force on at least one tape reel (11, 12) contained in a housing of the tape cassette. The housing includes a window (5) having a cutout (6) and a transparent component (7) received therein and the or each pressure spring is provided with at least one bent-over portion (2a, 2b) embracing an edge portion or edge portions of the windows (5) to captively fasten the spring(s) to the housing.

The invention also relates to a pressure spring for a tape cassette.

12 Claims, 5 Drawing Figures

TAPE CASSETTE HAVING ONE OR MORE PRESSURE SPRINGS, AND A PRESSURE SPRING FOR THIS PURPOSE

This invention relates to a tape cassette having a housing containing at least one tape reel and provided with window means comprising at least one opening defined by housing wall means and at least one transparent member received in said at least one opening and located over a central region of said at least one tape reel, and at least one pressure spring which exerts a spring force on said at least one tape reel. The invention also relates to a pressure spring for such a tape cassette.

Pressure springs for tape cassettes are sometimes referred to as reel pressure springs, and are intended for all commercially available video cassettes of the VHS and Beta video systems, as well as for a novel 8 mm video cassette. In all these cassettes, the coplanar reels are pressed toward the lower half of the housing by curved reel pressure springs which are fastened inside the upper half of the housing and are punched out from spring sheet. Hence, when such a cassette is placed in the appropriate playback apparatuses, the reels lie evenly on the hub holders of the apparatus and run smoothly when the tape is played back. All such reel pressure springs have the same function, but their size and, if appropriate, spring power differ since the particular cassettes, their reels and their reel spacings also differ in size.

Each pressure spring is usually manufactured by punching it out of a spring steel strip in an advantageous manner which saves material and enables a rapid punching sequence.

German Utility Model No. 8,335,294 (corresponding to GB patent application No. 8,430,901) proposes a pressure spring for VHS cassettes, which spring can be fastened in the region of a cassette window by clamping or welding. In an advantageous embodiment, the pressure spring and the window are provided with interlocking teeth in order to make possible fastening of the pressure spring within the area of movement of the tape reels. However, a precondition in this case is that the upper part of the cassette must be sufficiently thick. Furthermore, the necessary modifications to the shape of the cassette window are expensive, since it is necessary for the window to be provided with two gaps in which the pressure spring is inserted and held.

A video cassette having individual springs cut out in a wavy shape has been disclosed, the spring being located in the region of the window but being fastened to the cassette housing by means of two rivets. The fastening operation is expensive, and the springs may be lost during assembly.

It is an object of the present invention to provide a pressure spring for tape cassettes which is simple to mount, and which makes it possible to produce reliably operating and more economical tape cassettes.

According to one aspect of the invention there is provided a tape cassette having a housing containing at least one tape reel and provided with window means comprising at least one opening defined by housing wall means and at least one transparent member received in said at least one opening and located over a central region of said at least one tape reel, and at least one pressure spring which exerts a spring force on said at least one tape reel, wherein the at least one spring includes a bent over portion embracing an edge of the, or a respective one of the, transparent member(s) and positioned in the said, or a respective one of the said, opening(s) in between said housing wall means defining the, or the respective, opening and the embraced edge of the transparent member to captively fasten the spring to the housing.

This provides a tape cassette which has a pressure spring which can be mounted simply and reliably and, in contrast to all conventional pressure springs of this type, is secured, against falling out, as at early a stage as when it is mounted.

According to another aspect of the invention there is provided a pressure spring for a tape cassette, in particular a video tape cassette, having a housing containing at least one tape reel and provided with at least one window, said window comprising a cutout in the housing and a transparent member which fits into the cutout and is located over a central region of said at least one tape reel, the pressure spring being designed to be fastened to the housing to exert a spring force on said at least one tape reel, wherein the spring includes a fastening portion having a bent over portion for embracing an edge portion of the transparent member to captively fasten the spring to the housing when the transparent member is fitted in the cutout with the bent over portion positioned between a wall of the cutout and the embraced edge of the transparent member.

The pressure spring suitably includes a fastening portion one end of which is formed by the bent over portion and the other end of which may be straight, or can also be bent over in the form of a hook for fastening to the transparent member. Advantageously, the hook end has a cross-section which is essentially bent to form two right angles.

Advantageously, one or more tongue-like spring parts preferably cut out of the middle, and bent away from the plane of the spring, are provided. This results in a pressure spring which can be punched out from a steel strip in one operation and is therefore economical to produce.

An embodiment which is advantageous with regard to space and to assembly and manufacture comprises a tape cassette, in particular a video tape cassette, which has a housing, one or more tape reels and one or more windows, the latter consisting of a cutout in the housing and a transparent member which fits into this cutout and is located over the middle of a tape reel, and a pressure spring which exerts a spring force on one or more tape reels in the direction of a defined operating position, wherein the spring is bent over in the form of a hook at one or both ends and can be suspended between the cutout in the housing and the transparent member, so that the hook end grips the transparent member, and is held so that it cannot be lost.

This ensures reliable fastening of the spring(s) in conjunction with the transparent member, although the predominant part of the transparent area remains unobscured and continues to allow the user to check the tape position and distribution.

In another advantageous embodiment of a tape cassette, wherein two tape reels and one window which, relative to the periphery, extends over the middle of both tape reels are provided, a pressure spring is suspended at each end of the transparent member, and each spring has a cut-out tongue-shaped spring part which is bent away from the plane of the spring and exerts a spring force on the center of the associated tape reel.

In one version of such a tape cassette having two tape reels, a pressure spring suspended in the middle of the transparent member has two spring parts which are cut out in the form of a tongue and bent away from the plane of the spring, and each of which exerts a spring force on the center of the associated tape reel.

Figure 2:
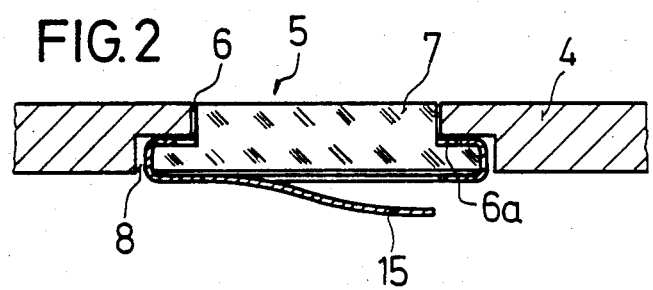
Figure 3:
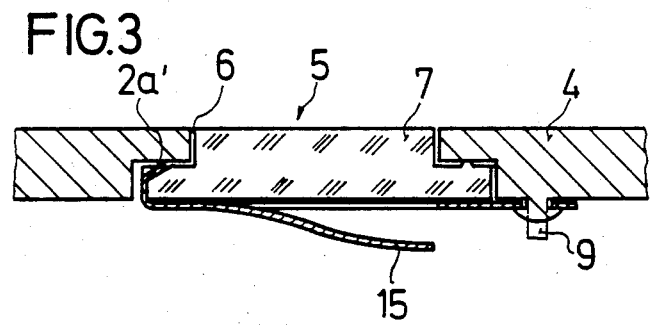
Figure 4:
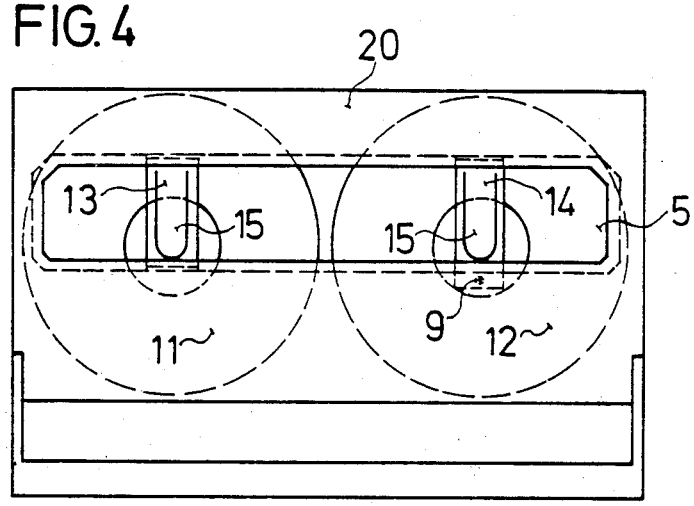
Figure 5:
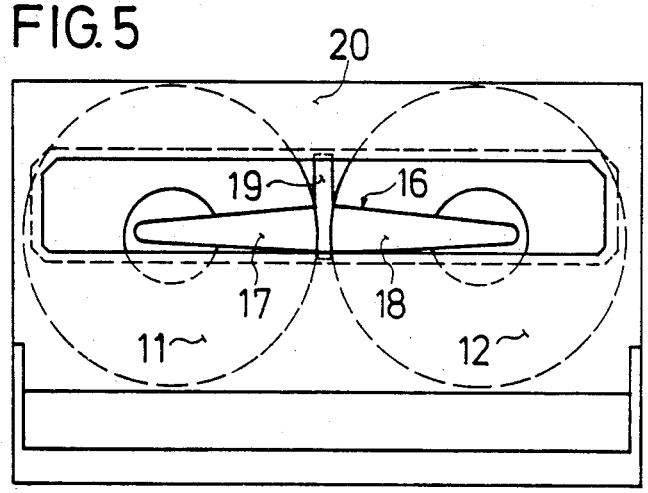

Embodiments of the invention will now be described, by way of example, with reference to the accompanying drawings, in which:

FIG. 1 is a perspective view showing two embodiments of a pressure spring according to the invention, FIG. 2 is a schematic sectional view showing one embodiment of pressure spring shown in FIG. 1 fastened at two ends to a window of a cassette housing, FIG. 3 is a schematic sectional view showing the other embodiment of pressure spring shown in FIG. 1 and fastened at one end to a window of a cassette housing, FIG. 4 is a plan of an 8 mm Video Cassette having two pressure springs according to the invention, and FIG. 5 is a plan view of the cassette shown in FIG. 4 but provided with a single, double-armed pressure spring.

FIG. 1 shows two advantageous embodiments 1a and 1b of a pressure spring 1, spring 1a having two hook-shaped ends 2a and 2b, each essentially possessing two 90° bends, and spring 1b having only one such hook-shaped end 2a and a straight fastening end 3 for fastening to housing 4 of the cassette. FIGS. 2 and 3 show methods of fastening the springs 1a and 1b, respectively, in a conventional cassette window 5, comprising an opening or cutout 6 formed in the housing and a transparent component or member 7. In order to weld the transparent component 7 in the cutout 6, the latter is provided with a peripheral edge 6a. Hence, a step gap 8 is provided between housing 4 and transparent component 7 and is used, on one or both sides, for suspending and holding the one or more hook-shaped ends 2a. In FIG. 3, the hook end 2a' has been slightly modified by increasing one of the two angles of hook ends 2a. The dimensions and shape of the gap 8 and the dimensions and shape of the hook end 2a must be matched up with one another so that the hook end 2a can easily be inserted into the gap and is thus prevented in practice from falling out when the window is mounted. Advantageously, insertion of the spring 1b is also possible after the transparent component has been welded in (cf. FIG. 3).

If both ends 2a and 2b are hook ends, the spring 1 can also be pushed into position over the transparent component 7 from an end of the latter. FIG. 3 shows an embodiment in which the flat end 3 of the spring 1b is fastened to the cassette housing by means of a rivet 9 which passes through a fastening aperture 10. In the case of FIG. 2, the spring 1 can be pre-mounted on the transparent component 7 before the latter is mounted in the housing 4 and thus cannot be lost; it remains secured in position during all manufacturing steps, at least until the transparent component 7 is finally fastened and hence until the window 5 is finally mounted. For all embodiments described above, the windows can be employed in their conventional shape and dimensions, i.e. without expensive modifications.

After the transparent component 7 has been welded into the opening 6 and the spring 1b then inserted into the gap 8, the aperture 10 in the flat end 3 of the spring is pushed over a pin 9 of the housing. The distance between aperture 10 and hook end 2a can advantageously be such that the spring is gently clamped between the window cutout 6 (gap 8) and the pin 9 of the housing. This again secures the pressure spring 1 against falling out, until the final riveting operation by plastic deformation of the pin 9 to rivet form.

FIG. 4 shows an 8 mm cassette 20 which possesses two tape reels 11 and 12, a window 5 and individual pressure springs 13 and 14 which correspond to the shape of spring 1a or 1b. It is clear that, in spite of the reliable action of pressure springs 13 and 14, the latter occupy only a small part of the window area, so that the tape distribution can be observed unhindered. None of the novel spring embodiments impedes the running of the tape. The springs, which in this case are shown, by way of example, simply with spring tongues 15 which are preferably punched out from the middle, and are bent away from the plane of the spring, can also be of some other design, i.e. can have a more attractive shape.

FIG. 5 shows another embodiment of just such a cassette 20, which comprises a two-armed spring 16 having arms 17 and 18 and a narrow fastening part 19 having two hook-shaped ends as in spring 1a, or one hook-shaped end as in spring 1b. The form of the narrow part 19 and the arrangement of the arms 17 and 18 still permit satisfactory monitoring of the roll size and hence of the tape volume available in each case.

The springs 1a, 1b, 13, 14 and 16 can be produced from any suitable spring material, such as spring sheet, plastic, etc., but are preferably produced from strip material, from which the spring is punched out.

I claim:

1. A tape cassette having a housing containing at least one tape reel and provided with window means comprising at least one opening defined by housing wall means and at least one transparent member received in said at least one opening and located over a central region of said at least one tape reel, and at least one pressure spring which exerts a spring force on said at least one tape reel, wherein the at least one spring includes a bent over portion embracing an edge of the, or a respective one of the, transparent member(s) and positioned in the said, or a respective one of the said, opening(s) in between said housing wall means defining the, or the respective, opening and the embraced edge of the transparent member to captively fasten the spring to the housing.

2. A tape cassette according to claim 1, in which the at least one pressure spring has two bent over portions which are bent towards each other to embrace a pair of opposed parallel edges of said transparent member.

3. A tape cassette according to claim 1, having two tape reels and a single opening of said window means extending over the central regions of both said tape reels, wherein a pressure spring is fastened adjacent each end of the single transparent member received in said opening, each spring having a tongue-shaped cutout spring part exerting a spring force on the central region of the associated tape reel.

4. A tape cassette according to claim 1, having two tape reels and a single opening of said window means extending over the central regions of both said tape reels, wherein a single pressure spring is fastened substantially midway between opposite ends of the single transparent member received in said opening, the pressure spring having two tongue-shaped cutout spring parts each of which exert a spring force on the central region of the associated tape reel.

5. A tape cassette according to claim 3 in which the said tongue-shaped cutout spring parts are bent away from the plane of the transparent member to which the at least one pressure spring is fastened.

6. A pressure spring for a tape cassette, in particular a video tape cassette, having a housing containing at least one tape reel and provided with at least one window, said window comprising a cutout in the housing and a transparent member which fits into the cutout and is located over a central region of said at least one tape reel, the pressure spring being designed to be fastened to the housing to exert a spring force on said at least one tape reel, wherein the spring includes a fastening portion having a bent over portion for embracing an edge portion of the transparent member to captively fasten the spring to the housing when the transparent member is fitted in the cutout with the bent over portion positioned between a wall of the cutout and the embraced edge of the transparent member.

7. A pressure spring according to claim 6, wherein the bent over portion is hook-shaped.

8. A pressure spring according to claim 6, wherein the fastening portion has opposite end portions one of which is provided by said bent over portions.

9. A pressure spring according to claim 8, wherein the other end portions of said fastening portion is straight and includes means for facilitating fastening of the spring to the housing.

10. A pressure spring according to claim 8, wherein the other end portion of said fastening portion also comprises a bent over portion, which is in the shape of a hook, the two bent over portions being bent towards each other for embracing opposed edges of the transparent member.

11. A pressure spring according to claim 6, wherein the bent over portion has a cross-section which is substantially bent to form two right angles.

12. A pressure spring according to claim 6, wherein at least one tongue-shaped spring part, which is cut out from the middle, and bent away from the plane of the spring, is provided.

* * * * *